United States Patent [19]

Van Brederode

[11] Patent Number: 4,739,646

[45] Date of Patent: Apr. 26, 1988

[54] METHOD OF TESTING AN OFFSHORE STRUCTURE FOR MECHANICAL FAULTS

[75] Inventor: Peter J. Van Brederode, The Hague, Netherlands

[73] Assignee: Smit-Iso Maintenance B.V., Rotterdam, Netherlands

[21] Appl. No.: 937,962

[22] Filed: Dec. 4, 1986

[30] Foreign Application Priority Data

Dec. 4, 1985 [NL] Netherlands ........................ 8503349

[51] Int. Cl.⁴ ............................................ G01N 3/30
[52] U.S. Cl. ......................................... 73/12; 73/788
[58] Field of Search ................ 73/788, 849, 594, 802, 73/786, 662, 672, 12; 254/257

[56] References Cited

U.S. PATENT DOCUMENTS

| | | | |
|---|---|---|---|
| 4,164,149 | 8/1979 | Okubo | 73/594 |
| 4,433,581 | 2/1984 | Scott et al. | 73/786 |
| 4,549,437 | 10/1985 | Weirs et al. | 73/594 X |

Primary Examiner—Jerry W. Myracle
Attorney, Agent, or Firm—Webb, Burden, Robinson & Webb

[57] ABSTRACT

A method of testing offshore structures for mechanical faults includes the application of a tensile force to the structure from an outside point such as a tug boat the abrupt uncoupling of the tensile force from the structure and the detecting and indicating of the local vibration behaviour of parts of the structure by acceleration detectors mounted on said parts. The information thus obtained is analysed and may be compared with information about this local vibration behaviour obtained from calculations, simulations and/or earlier tests.

4 Claims, 3 Drawing Sheets

METHOD OF TESTING AN OFFSHORE STRUCTURE FOR MECHANICAL FAULTS

The invention relates to a method of testing an offshore structure for mechanical faults, and to an offshore structure equipped for a test of this kind.

It has been attempted to test offshore structures for mechanical faults without it being necessary to work with divers and underwater cameras, because of the complications and cost involved and because their use is limited by weather conditions and depth. Attempts have thus been made to carry out this test by measuring the vibration behaviour of components of the structure under the action of wind and wave loads. The vibrational energy available for this purpose is greatly dependent on weather conditions. In many cases valuable data can consequently be obtained only under very bad weather conditions, while even then the vibrational energy is often insufficient for the test, particularly in the case of parts of the structure at greater depths below the surface of the water.

In this connection it has been attempted to mount a source of vibration (a "shaker") on the structure and to measure its action on various parts of the structure. The advantage of this method is that the vibration applied, for example of a simple sinusoidal pattern, is well known in respect of amplitude and frequency. Disadvantages are the constructional complications, the considerable time involved, since testing at numerous frequencies is necessary, and the consequent inaccuracy because there will always be untested frequency ranges between the frequencies measured. Moreover, a vibrator of this kind cannot make measurements in the very low frequency range.

It is known both to apply a single source of vibration for this purpose or to apply combined sources of vibration and measuring means to different parts of the structure (H. Crohas: Damage-detection monitoring method for offshore platforms is field-tested, Oil & Gas Journal, vol. 80, no. 8, February 1982, pp 94–103, and Laffont & Agnello: Inspection en service des plates-formes offshore, Petrol et Techniques, no. 317, 2985, pp 39–42). It is also known to emit acoustic signals and to measure reflections thereof from different parts of the structure to test the quality thereof in offshore structures (EP-A-No. 0 158 569). This has serious limitations in possiblities and results.

The invention seeks to make an improvement in this respect.

To this end a method according to the invention is characterized in that from a point outside and not carried by the structure which is to be tested, for example from a service ship or tugboat, a tensile force is applied to the structure, that the means applying said tensile force is abruptly uncoupled from the structure by means such as a slip hook in order to effect the sudden interruption of the tensile force, and that observation means in a plurality of positions on the structure detect and indicate the local vibration behaviour of the structure.

Vibrations can thus easily be generated in the structure, whose energy is concentrated in the lower frequencies and which cause all parts of the structure to vibrate in the lowest natural oscillation frequency, while even at a considerable distance from the point of application a good picture of the oscillation behaviour of components of the structure can be obtained. By means of the external tensile force sufficient energy can be introduced into the structure to produce considerable vibrational energy even in components of the structure which are situated deep under water, and to enable good measurements to be made, while in a simple manner this tensile force can be exerted at different points and different heights in the structure, and if desired both above and below the surface of the water, and in different horizontal directions. It is usually sufficient to apply said force in two horizontal directions at right angles to one another, while the exertion of an eccentric force in order to generate total torsional loads is not necessary. Whether the force must be applied at different heights and both above and under the surface of the water will depend on special circumstances, on the height of the structure and the depth of immerson.

According to the invention the offshore structure which is to be tested is characterized in that it is provided with a plurality of vibration observation means disposed in different positions on the structure, and with signal lines for transmitting data relating to the vibrations measured from said observation means to a recording device.

The vibration observation means disposed on parts of the structure may be usual transducers for the measurement of accelerations, for example inductive acceleration transducers made by Hottinger, type B12/200.

Through the application of the invention it is possible to detect and locate mechanical faults, for example cracks, in parts of the structure owing to the fact that the natural frequency of such parts of the structure is lowered by such faults. As an example it may be mentioned that a natural vibration frequency of for example 6.9 Hz was measured in a brace or cross tie in an offshore structure in which there is no fault, or in its fastening to the remainder of the structure, while in thè event of a crack over the entire periphery at the point of connection to a column the measurement will for example be 5.8 Hz. If intermediate frequencies are measured, this may indicate a crack existing over only a part of the periphery of the brace or cross tie.

The invention may be applied to a new structure, and there will then obviously normally be no comparison data for determining whether cracks or other faults exist, for example in weld joints. By testing parts of the structure before assembly, during or before construction, by testing the structure during or after assembly and before it is placed in water or in deeper water, or before the structure is afloat, by calculations and on the basis of experience with other structures, it is, however, often possible, even by means of such first practical measurements on a new structure, to judge whether it probably has a fault at one or more points which can be located. For a new structure of this kind the transducers can previously be permanently installed inside hollow braces or the like.

If the invention is applied for the first time to an existing structure, there will not immediately be any comparison data available for accurate appreciation of the observation. However, as in the case of a new structure, an insight can be gained by comparing the measurements with computer simulations, which give a good insight into the vibration behaviour which can be expected. Another possible method, to be applied instead of or in addition to this procedure, consists in comparing the measurements made on comparable components of the structure. The structure will frequently have planes of similar construction which lie approximately parallel to one another, and if measurements on a component, such as a brace, in one plane are compared with those on a component lying at the same height, extending in the same direction, and of identical construction in the other plane, an insight will be obtained into the mechanical quality of the components and their connections; differences in frequency will point to an irregularlity, and it may be concluded that a fault exists in the component having the lowest frequency measured.

Normally a vibration behaviour will be observed showing a slower vibration of the entire structure, on which a faster vibration of the component is superposed. The two vibrations are naturally heavily damped in amplitude, but the frequency of the faster, superposed vibration is sufficiently stable to be unequivocally determined. The measurement results can be examined by spectral analysis, and an insight can thus also be gained into the course of amplitudes with the frequencies, and therefore also into resonant amplitude rise and damping.

The external force to be applied is for example 30 to 70 tonnes, and preferably not greater than 20% of the design load in the same direction, which in practical case is sufficiently great to make a good measurement of the vibration behaviour of components.

The ideal is to repeat the method according to the invention periodically at suitable intervals.

The invention will now be explained more fully with the aid of the accompanying drawings, in which.

Figure 1:
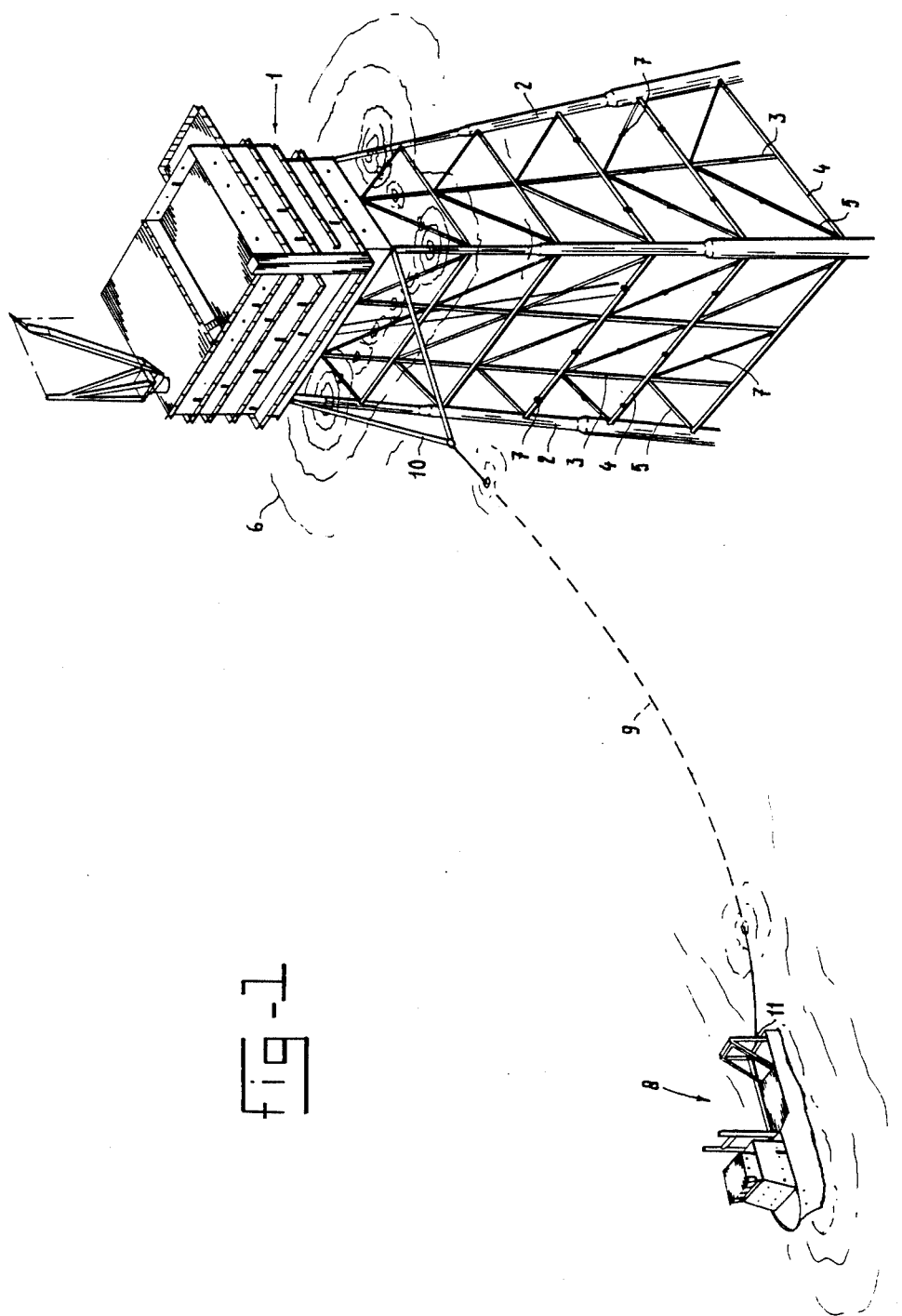
FIG. 1 is a view in perspective of an offshore structure, which in this case is a production platform resting on the seabed, with the means for applying to it the method according to the invention.

An offshore production, processing or other platform 1 for petroleum or gas extraction rests in the present case by means of corner columns 2 on the seabed, and includes intermediate columns 3; the columns are interconnected by horizontal braces 4 and inclined braces 5. The normal sea level is designated 6.

Each of a plurality of braces 4 and 5 is provided with an acceleration monitoring transducer 7, preferably disposed in the middle of each of the respective braces, while on the right in FIG. 1 similar transducers are also installed in the intermediate column 3, which here has a small cross-section.

A tugboat or other auxiliary vessel 8 is connencted by means of a cable 9, which divides into two end cables 10, to the top end of two adjoining corner columns 2. A slip hook 11 of known construction connects the cable 9 to the auxiliary vessel 8. A tugboat is normally equipped with a slip hook for emergency use during normal towing operations.

For the application of the method according to the invention, the vessel 8 is driven in such a manner as to apply a tensile force to the cables 9 and 10. After the platform 1 has reached a sufficiently stable state and the tensile force applied to it by the cables 9 and 10 has reached the desired stable value, depending on the size of the platform, of between 30 and 70 tons, the slip hook 11 is operated to relieve the cables 9 and 10 suddenly of tension.

Each transducer 7 then measures the vibration pattern (the accelerations) of the component on which it is mounted. By way of signal lines the measurements made by all the transducers can for example be transmitted to the deck of the platform and there recorded.

In the present case transducers are shown only under water and only on braces 4 and 5, with a single one on the right-hand column 3. Transducers can also be installed on thicker columns, although in many structures there is not much need for this because of the strength of the columns and the slight risk of mechanical faults. Similar transducers can also be installed on parts above water.

After this test the cables 10 can be attached to two columns 2, of which at least one is different from the two columns in the first test and together lying in a different plane from that containing the columns to which the cables shown in the drawing are attached, and the test can then be repeated. Transducers can also be installed on any braces situated within the outer periphery of the platform (its jacket). During the test with the cables 9 and 10 attached as shown in the drawing it may be expedient for measurements also to be made by the transducers disposed in said other plane on the right in FIG. 1, although this is usually not or only slightly relevant.

It is practically always preferable to make measurements simultaneously, during the same test, on the same components in two parallel outer faces of the structure, that is to say, referring to FIG. 1, to make simultaneous measurements in the front and rear faces, thus reducing the time required for the complete test and permitting rapid comparison of the measurements made on corresponding components in the respective planes, in order to enable a fault to be more easily traced.

In addition, the test can be repeated a number of times on each of the two outer faces of the platform by attaching the cables 10 to the same outer face but at different heights, for example at three different heights, two of which are under water. However, this is frequently unnecessary, since the application of the force at different heights has more influence on the slow vibration of the whole structure than on the fast vibrations of the individual components.

Figure 2:
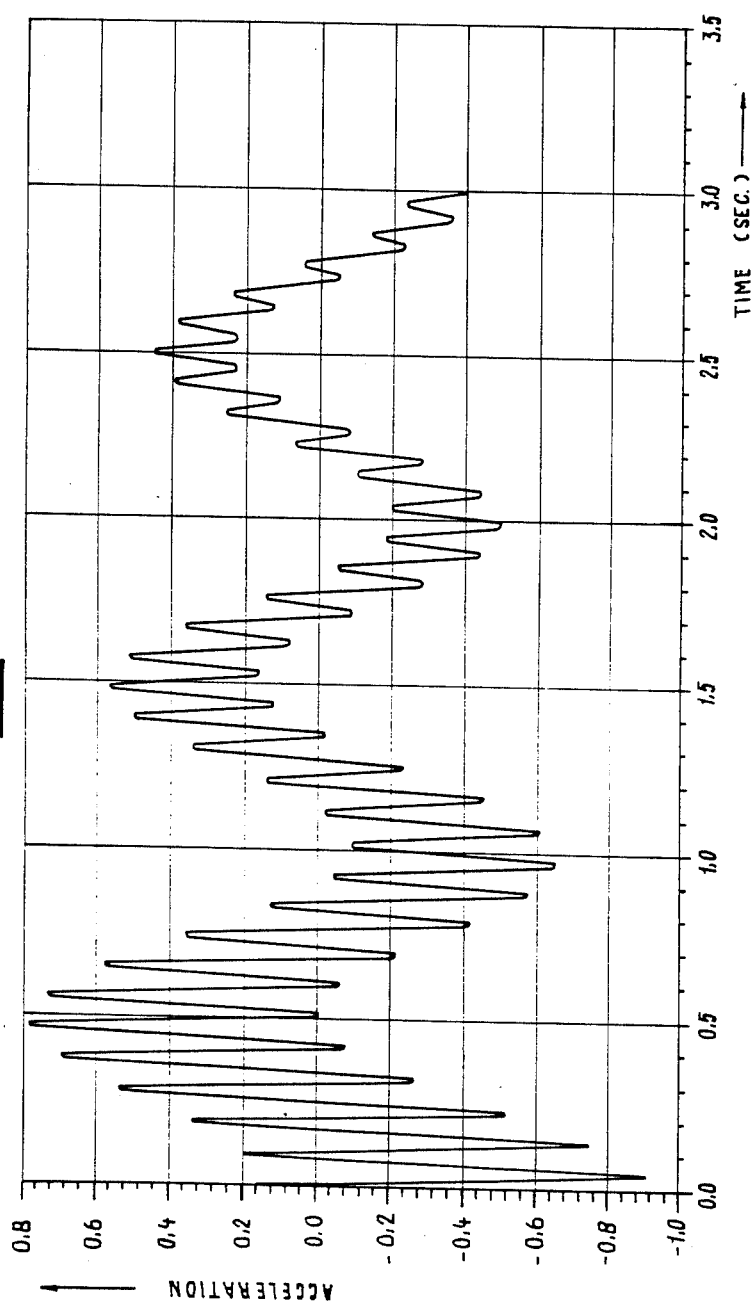
FIG. 2 is a graph of the accelerations measured on a component thereof and plotted against time.

FIG. 2 gives as an example the results of measurements made with one of the transducers. Over a period of 3 seconds an acceleration curve of the type shown was obtained, and it is thus clear that the acceleration follows a pattern mainly composed of two damped simple vibrations: one vibration with a period of about 1 second, which is attributable to the vibration of the entire platform, and one with a frequency of ±10 Hz, superposed thereon and attributable to the vibration behaviour of the component on which the transducer is mounted, together with its fastening to more rigid components, such as adjoining columns. Said faster vibration is highly dependent, in respect of its frequency, on the mechanical quality of the component in question and on its fastening to said more rigid components, and it is thus this higher frequency from which conclusions can be drawn regarding the mechanical quality of said component and its connection.

Figure 3:
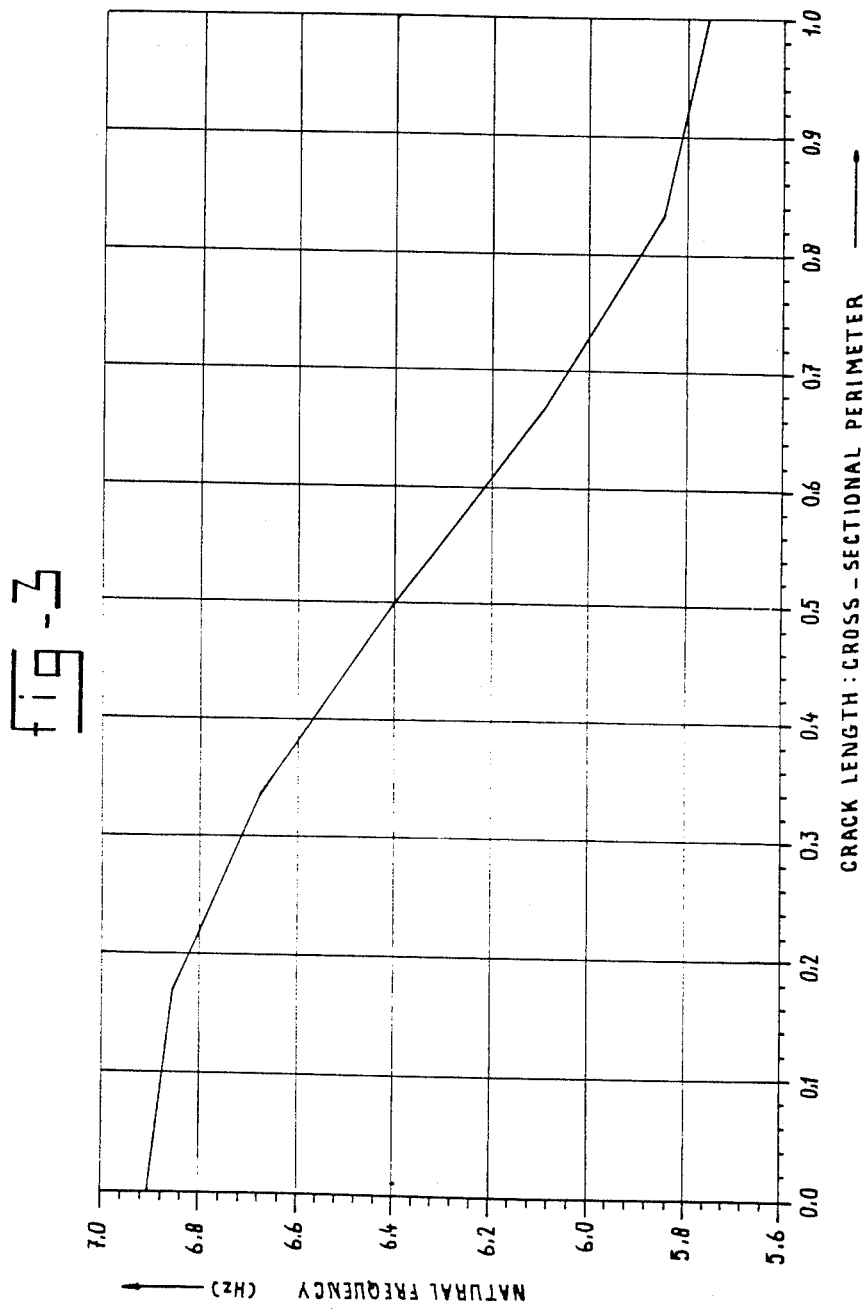
FIG. 3 is a curve of the vibration frequency of a component plotted against the extension of a crack between the component and a column to which it is welded.

FIG. 3 makes this clear for a different component from that for which FIG. 2 was recorded, relating to a simulation test in which a crack was artifically made in the connection between a brace and a column, which crack was gradually made longer. With good connections to the more rigid components a vibration frequency (for said faster vibration) of 6.9 Hz was for example found for that component. With a crack in one of the connections the frequency first fell slowly as the crack lengthened, and then fell more sharply until a frequency of ±5.76 Hz was measured when the crack completely destroyed the connection. The crack of increasing length was made between a circular brace and a circular but much thicker column, without fluent transition parts. A crack in a brace at a point between its end connections and any crack following an erratic path at a connection, for example in a fluent transition member between the brace and the column, will result in a different frequency curve plotted against the length of the crack, but will also show a falling natural frequency as the crack lengthens.

If the frequency values measured previously are retained, for example on paper or in the memory of a computer, it will then be easy in a later test to determine easily and directly whether the frequency values measured in the later test differ substantially from those measured previously, and conclusions can then be drawn directly therefrom with regard to the location and seriousness of any mechanical defects.

The invention can also be usefully applied to floating and semi-submerged structures.

Instead of a slip hook it is also possible to use other means for suddenly interrupting the force applied to the structure, for example explosion bolts. The connection can then more easily be broken simultaneously at two points, for example at the points where the two cables 10 are attached to the structure. The cables will then not be able to strike against parts of the structure. It is also possible to install the quick-break connection at the point where the cable 9 merges into the cables 10.

If a crack occurs in a component or in the connection of a component, such as a brace, on which the measurement is to be made, to a column, the vibration behaviour to be measured will depend on whether or not the component is filled with water either completely or partially with inclusion of air. The natural frequency of the component will fall more sharply in proportion as it is increasingly filled with water.

By spectral analysis, made on a measurement result of the kind shown in FIG. 2, more information can be obtained regarding the curve of the amplitudes plotted against the frequencies, and thus regarding the resonant amplitude rise and damping behaviour, both when no mechanical fault exists and when there is such a fault.

When a structure of this kind is subjected to actual loads in one direction, components in planes parallel to that direction will usually be more liable to crack and deformation than components in planes at right angles to the direction in question, because of the tensile, compressive and buckling forces. For the measurement according to the invention the transverse vibration of the component in the region between its ends is, however, more enlightening, for which reason in the test according to FIG. 1 the measurements on components in the plane at front left of the drawing, and those in the plane not shown at rear right are relevant.

I claim:

1. A method of testing an offshore structure for mechanical faults, comprising applying a tensile force to the structure from a point outside and not carried by the structure being tested, abruptly uncoupling the tensile force from the structure in order to effect the sudden interruption of the tensile force, detecting and indicating local vibration behaviour at a plurality of positions on the structure.

2. A method according to claim 1, wherein the tensile force is applied in succession to the structure in two horizontal directions approximately at right angles to one another.

3. A method according to claim 1, wherein the tensile force is applied in succession at different heights on the structure.

4. A method of testing a structure according to claim 1 in which the test is repeated and the data recorded in an earlier test are compared with those obtained in a later test in order to detect any deviations in the vibration behaviour of parts of the structure and determine and locate any mechanical faults in the structure.

* * * * *